US012749792B2

(12) United States Patent
Chiu et al.

(10) Patent No.: US 12,749,792 B2
(45) Date of Patent: Sep. 29, 2026

(54) BRACKET STRUCTURE AND ANTENNA FIXING DEVICE

(71) Applicant: Wistron NeWeb Corporation, Hsinchu (TW)

(72) Inventors: Yu-Kai Chiu, Hsinchu (TW); Ying-Chih Liu, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 66 days.

(21) Appl. No.: 18/744,767

(22) Filed: Jun. 17, 2024

(65) Prior Publication Data

US 2025/0192414 A1 Jun. 12, 2025

(30) Foreign Application Priority Data

Dec. 8, 2023 (TW) ................................ 112147777

(51) Int. Cl.
*H01Q 1/12* (2006.01)
*F16L 3/12* (2006.01)
*F16M 13/02* (2006.01)

(52) U.S. Cl.
CPC .............. *H01Q 1/1207* (2013.01); *F16L 3/12* (2013.01); *F16M 13/02* (2013.01)

(58) Field of Classification Search
CPC .......... H01Q 1/12; H01Q 1/1207; H01Q 1/22; H01Q 1/42; F16L 3/12; F16M 13/02
See application file for complete search history.

(56) References Cited

U.S. PATENT DOCUMENTS

| | | | | |
|---|---|---|---|---|
| 11,522,280 | B2 * | 12/2022 | Bae | H01Q 1/12 |
| 2016/0312943 | A1 * | 10/2016 | Yang | H01Q 1/1207 |
| 2021/0359401 | A1 | 11/2021 | Bae | |
| 2025/0079684 | A1 * | 3/2025 | Tseng | H01Q 1/2291 |
| 2025/0192419 | A1 * | 6/2025 | Chiu | H01Q 1/24 |
| 2025/0286263 | A1 * | 9/2025 | Chen | H01Q 1/1207 |

FOREIGN PATENT DOCUMENTS

| | | | |
|---|---|---|---|
| CN | 204391241 | U | 6/2015 |
| CN | 103811843 | B | 3/2016 |
| CN | 217788773 | U | 11/2022 |
| TW | I709016 | B | 11/2020 |

* cited by examiner

*Primary Examiner* — Eret C Mcnichols
(74) *Attorney, Agent, or Firm* — McClure, Qualey & Rodack, LLP

(57) ABSTRACT

A bracket structure includes a body, two retaining walls, at least one first stop part, and at least one second stop part. The two retaining walls are respectively connected to two ends of the body, and respectively form an accommodating groove with the body, and a virtual connection line is extended between the two accommodating grooves. At least one first stop part protrudes from the body towards the virtual connection line. At least one second stop part protrudes from at least one of the two retaining walls towards the virtual connection line, and at least one first stop part and the at least one second stop part are separated by a clamping space in a direction. Thus, the bracket structure fix the antenna module without using any fixing components.

16 Claims, 4 Drawing Sheets

BRACKET STRUCTURE AND ANTENNA FIXING DEVICE

RELATED APPLICATIONS

This application claims the benefit of priority to Taiwan Patent Application Serial No. 112147777, filed on Dec. 8, 2023. The entire content of the above identified application is incorporated herein by reference.

BACKGROUND

Technical Field

The present disclosure relates to a bracket structure, and in particular to a bracket structure and an antenna fixing device.

Description of Related Art

When installing antennas, general products are usually assembled through screws or adhesive backing, adhesive, or curing glue and other fixing ways that are not conducive to sustainable recycling. However, in addition to the high cost, the fixing way for the antenna module as such is not easy to assemble and disassemble, and it is not conducive to recycling and does not meet the goal of green product design.

In view of this, there is a lack of a low-cost, easy-to-assemble and disassemble antenna fixing device with good recyclability in the market, so the relevant industry is looking for a solution.

SUMMARY

According to one embodiment of the present disclosure, a bracket structure is provided. The bracket structure includes a body, two retaining walls, at least one first stop part, and at least one second stop part. The two retaining walls are respectively connected to two ends of the body, and respectively form an accommodating groove with the body, and a virtual connection line is extended between the two accommodating grooves. At least one first stop part is disposed on the body, and protrudes from the body towards the virtual connection line. At least one second stop part is disposed on at least one of the two retaining walls, and protrudes from at least one of the two retaining walls towards the virtual connection line, and at least one first stop part and the at least one second stop part are separated by a clamping space in a direction. The direction is perpendicular to the virtual connection line.

According to another embodiment of the present disclosure, an antenna fixing device is provided. The antenna fixing device includes an antenna module and a bracket structure. The bracket structure is configured to fix the antenna module and includes a body, two retaining walls, at least one first stop part and at least one second stop part. The two retaining walls are respectively connected to two ends of the body and respectively form an accommodating groove with the body to accommodate the antenna module, and a virtual connection line is extended between the two accommodating grooves. At least one of the first stop part is disposed on the body, and protrudes from the body towards the virtual connection line. At least one of the second stop part is disposed on at least one of the two retaining walls and protrudes from at least one of the two retaining walls towards the virtual connection line, and at least one first stop part and at least one second stop part are separated by a clamping space in a direction. The direction is perpendicular to the virtual connection line, and the at least one first stop part and the at least one second stop part clamp the antenna module from opposite directions towards the clamping space to tighten the antenna module.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
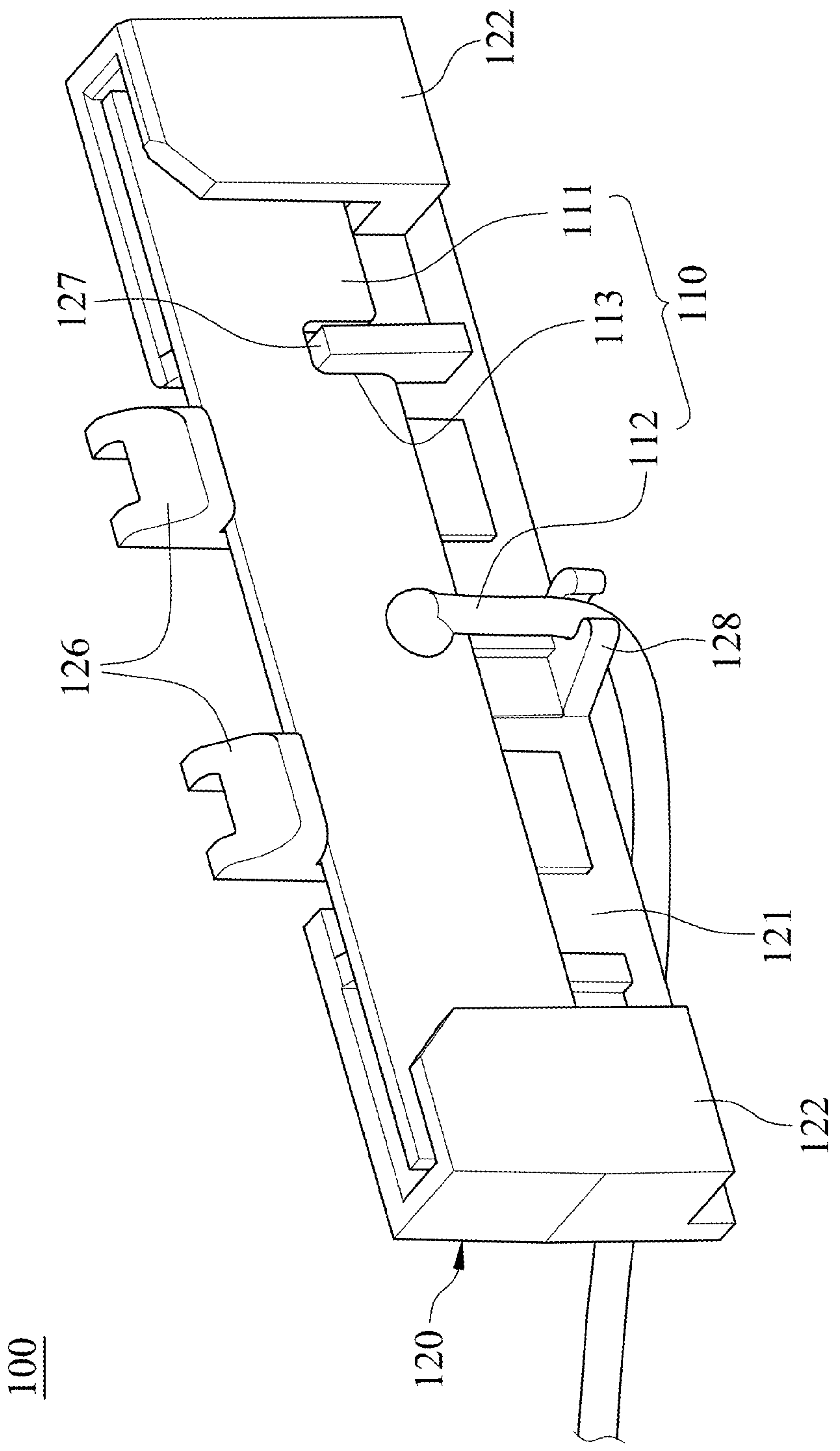
FIG. 1 is a three-dimensional schematic diagram of an antenna fixing device according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an" and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1. FIG. 1 is a three-dimensional schematic diagram of an antenna fixing device 100 according to an embodiment of the present disclosure. The antenna fixing device 100 includes an antenna module 110 and a bracket structure 120. The bracket structure 120 is configured to fix the antenna module 110. The antenna module 110 includes a substrate 111 and a connection cable 112. The substrate 111 is provided with a radiating element (not shown). The connection cable 112 is configured to connect the substrate 111 and a processing device (not shown). In the embodiment of FIG. 1, the antenna module 110 can be a Digital Enhanced Cordless Telecommunications (DECT) antenna, and the substrate 111 can be a PCB board, but the present disclosure is not limited thereto.

Figure 2:
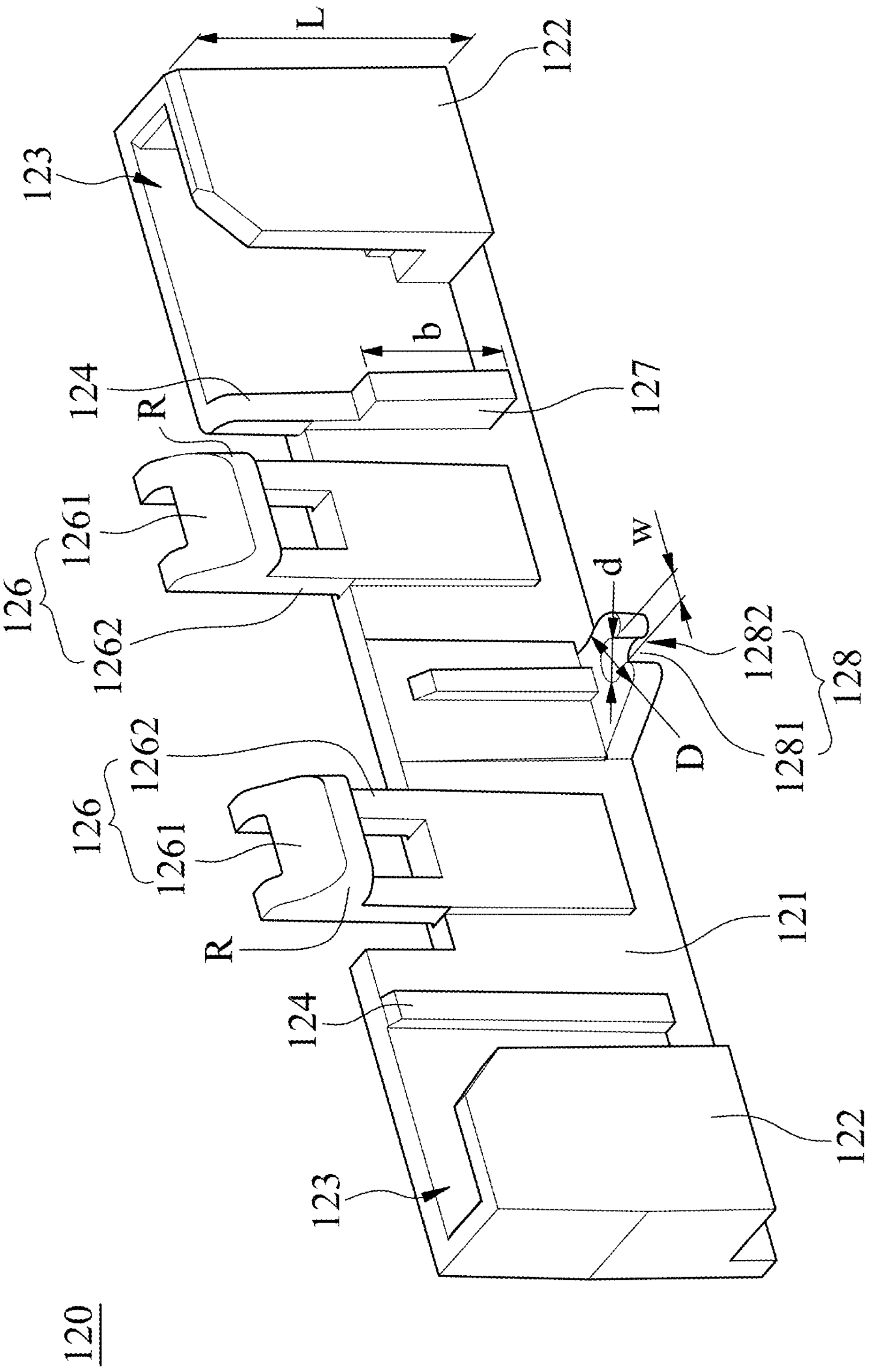
FIG. 2 is a three-dimensional schematic diagram of a bracket structure according to the embodiment of FIG. 1.
Figure 3:
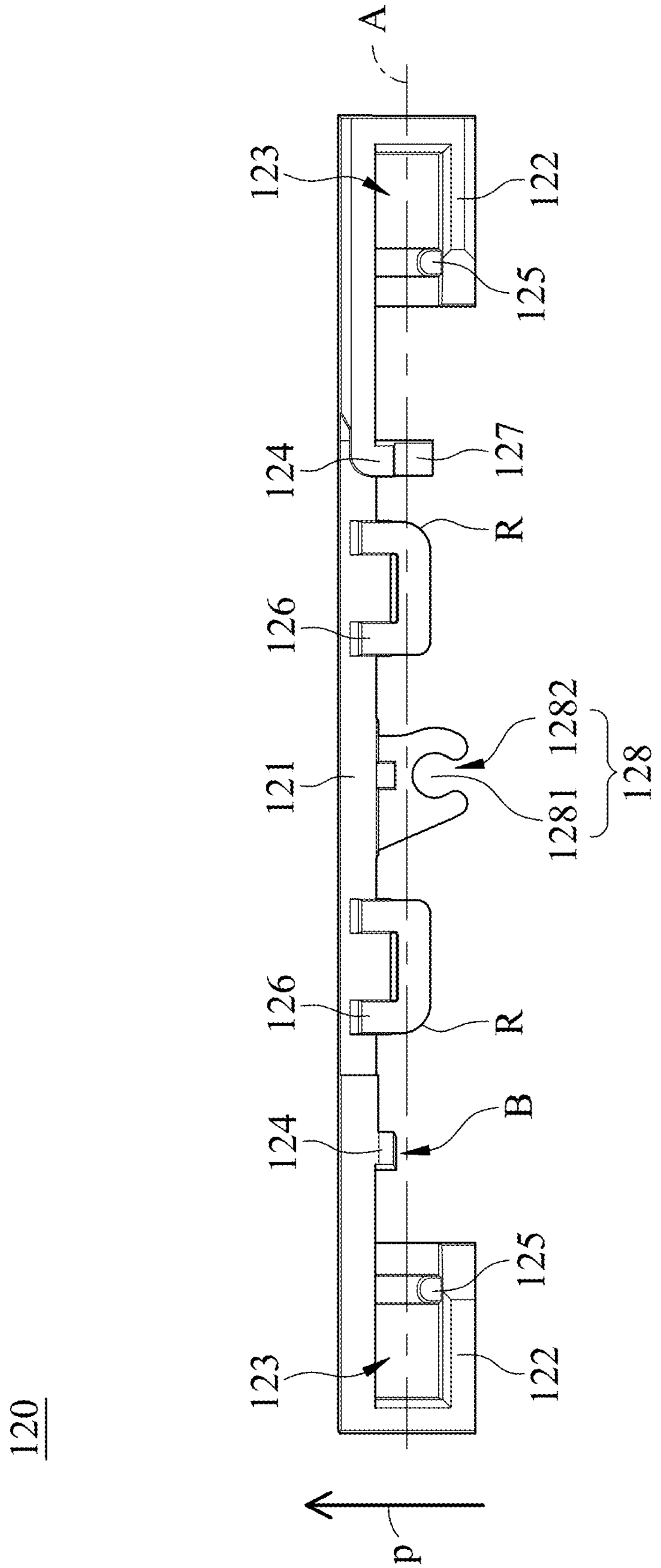
FIG. 3 is a top view of the bracket structure according to the embodiment of FIG. 2.

Referring to FIG. 1, FIG. 2, and FIG. 3. FIG. 2 is a three-dimensional schematic diagram of the bracket structure 120 according to the embodiment of FIG. 1. FIG. 3 is a top view of the bracket structure 120 according to the embodiment of FIG. 2. The bracket structure 120 includes a body 121, two retaining walls 122, at least one first stop part 124 and at least one second stop part 125. The two retaining walls 122 are respectively connected to two ends of the body 121 and respectively form an accommodating groove 123 with the body 121. The first stop part 124 is disposed on the body 121, and at least one second stop part 125 is disposed on at least one of the second retaining walls 122.

The accommodating groove 123 is configured to accommodate the antenna module 110. Specifically, a virtual connection line A is extended between the two accommodating grooves 123 (specifically, in the embodiment of FIG. 1, the virtual connection line A is extended along the long side of the body 121). The first stop part 124 protrudes from the body 121 towards the virtual connection line A. The second stop part 125 protrudes from the retaining wall 122 towards the virtual connection line A. The first stop part 124 and the second stop part 125 are configured in pairs. In the embodiment of FIG. 1, the number of the first stop part 124 and the second stop part 125 are two, and the two retaining walls 122 are respectively disposed with the second stop part 125, but the present disclosure is not limited thereto.

Specifically, the first stop part 124 and the second stop part 125 are separated by a clamping space B along a direction p. The direction p is perpendicular to the virtual connection line A. When the antenna module 110 is accommodated in the accommodating groove 123, the first stop part 124 and the second stop part 125 clamp the substrate 111 of the antenna module 110 from opposite directions towards the clamping space B to tighten the antenna module 110.

Therefore, the first stop part 124 and the second stop part 125 can clamp and squeeze the substrate 111 from opposite directions by adopting a pair of clamping and extrusion designs with microinterference, and avoid a shaking notch between the substrate 111 and the accommodating groove 123 so as to prevent the antenna module 110 from shaking and producing abnormal noise, and maintain the transmission quality of the antenna module 110.

Figure 4:
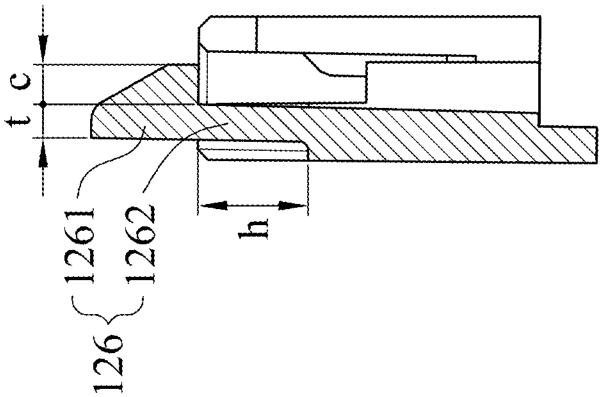
FIG. 4 is a cross-section view of the antenna fixing device according to the embodiment of FIG. 1.

Referring to FIG. 1 to FIG. 4. FIG. 4 is a cross-section view of the antenna fixing device 100 according to the embodiment of FIG. 1. The bracket structure 120 can further include at least one hook 126 for fixing the antenna module 110. The at least one hook 126 is disposed on top of the body 121 and includes a hooking portion 1261 and an elastic arm 1262. The elastic arm 1262 is connected to the hooking portion 1261 and the body 121. In the embodiment of FIG. 1, the number of the at least one hook 126 is two, and the hooks 126 are disposed at intervals along the long side of the body 121, but the present disclosure is not limited thereto.

The hooking portion 1261 is configured to fix the antenna module 110 in the accommodating groove 123. The hooking portion 1261 has a hook length c, which is the maximum fastening depth of the hooking portion 1261. The hook length c is between 0.5 mm and 2.5 mm. One end of the hooking portion 1261 close to the accommodating groove 123 has a guiding angle R. The guiding angle R is a rounded corner configured to help guide the direction of the antenna module 110 when assembled onto the body 121. The elastic arm 1262 has a width length ratio, which is the ratio of a long side h to a short side t (h/t) of the elastic arm 1262. The width length ratio is between 2.7 and 8.0.

Specifically, when assembling the antenna module 110 to the bracket structure 120, the two ends of the substrate 111 of the antenna module 110 are aligned with the accommodating groove 123, and is placed down through the hooking portion 1261 of the hook 126 so that the substrate 111 is put into the accommodating groove 123 and is engaged by the hooking portion 1261. When the substrate 111 is placed downward, it will butt against the hooking portion 1261. The guiding angle R of the hooking portion 1261 can prevent interference between the substrate 111 and the hooking portion 1261, allowing the antenna module 110 to enter the accommodating groove 123 relatively smoothly.

In addition, the parametric design of the hook length c of the hooking portion 1261 and the width length ratio of the elastic arm 1262 can enable the substrate 111 to have a good assembly step when it is inserted into the accommodating groove 123, which is conducive to determine whether the assembly is in place.

Furthermore, the parametric design of the width length ratio can avoid breaking the elastic arm 1262 when the substrate 111 and the hooking portion 1261 butt against each other.

Therefore, the bracket structure 120 fixes the antenna module 110 through the engagement of the hooking portion 1261 and the clamping of the first stop part 124 and the second stop part 125. In addition to effectively fixing the antenna module 110 without fixing components (e.g., screws, backing adhesive, adhesive, or curing glue), it is also easy for users to disassemble and recycle, thus complying with the green design goal.

Referring to FIG. 1 to FIG. 3. The antenna module 110 can further include a notch 113 on the substrate 111. The bracket structure 120 can further include a fool-proof piece 127 corresponding to the notch 113. The fool-proof piece 127 is connected to the first stop part 124 and protrudes from the first stop part 124 towards the virtual connection line A.

The fool-proof piece 127 is configured to limit the assembly direction of the antenna module 110. The fool-proof piece 127 has a fool-proof height b. The retaining wall 122 of the bracket structure 120 has a retaining height L. The ratio of the fool-proof height b to the retaining height L (b/L) is between 0.2 and 0.8.

Specifically, because the radiation of the antenna module 110 is directional, the fool-proof piece 127 can define the direction in which the antenna module 110 is fixed to the bracket structure 120. In addition, the parameter design of the ratio of the fool-proof height b and the retaining height L can ensure the correctness of the assembly direction of the antenna module 110 and prevent the notch 113 of the antenna module 110 from being set too long and causing the substrate 111 to break.

Referring to FIG. 1 to FIG. 3. The bracket structure 120 can further include a cable management fastener 128 connected to the body 121. In the embodiment of FIG. 1, the body 121, the retaining wall 122, the first stop part 124, the second stop part 125, the hook 126, the fool-proof piece 127, and the cable management fastener 128 of the bracket structure 120 are an integrally formed structure. The cable management fastener 128 includes a cable buckle hole 1281 and an opening 1282. The cable buckle hole 1281 is configured to limit the connection cable 112 of the antenna module 110. The connection cable 112 enters the cable buckle hole 1281 through the opening 1282.

Specifically, the connection cable 112 of the antenna module 110 has a cable diameter (not shown). The cable buckle hole 1281 has an aperture d and an outer diameter D. The opening 1282 has a width w. The cable diameter of the connection cable 112 is $d_{cable}$. The ratio of the aperture d to the cable diameter ($d/d_{cable}$) is between 1.1 and 1.4. The ratio of the width w to the cable diameter ($w/d_{cable}$) is between 0.70 and 0.95. The ratio of the outer diameter D to the aperture d (D/d) is between 1.5 and 3.0.

From the above embodiments, the bracket structure and the antenna fixing device according to the present disclosure have the following advantages:

First, through the pair of clamping design of the first stop part and the second stop part, the substrate can be clamped and squeezed from opposite directions to prevent the antenna module from producing shaking noise due to the shaking gap, thereby maintaining the transmission quality of the antenna module.

Second, the bracket structure fixes the antenna module through the engagement of the hooking portion, and the clamping of the first stop part and the second stop part. In addition to fixing the antenna module without fixing components (e.g., screws, backing adhesive, glue, or curing glue), it is also easy for users to disassemble and recycle, thus complying with the green design goal.

Third, the bracket structure is designed through parameters such as the guiding angle, hook length, width length ratio, and the fool-proof height, which is more conducive to the assembly of the antenna module.

The foregoing description of the disclosure has been presented only for the purposes of illustration and description option of the exemplary embodiments and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A bracket structure, comprising:
- a body;
- two retaining walls respectively connected to two ends of the body and respectively forming an accommodating groove with the body, and a virtual connection line being extended between the two accommodating grooves;
- at least one first stop part disposed on the body and protruding from the body towards the virtual connection line; and
- at least one second stop part disposed on at least one of the two retaining walls, and protruding from the at least one of the two retaining walls towards the virtual connection line, and the at least one first stop part and the at least one second stop part separated by a clamping space in a direction;
- wherein the direction is perpendicular to the virtual connection line;
- where the at least one first stop part and the at least one second stop part exert forces from opposite directions on a plate extending along the virtual connection line.

2. The bracket structure according to claim 1, further comprising:
- at least one hook disposed on top of the body, comprising:
- a hooking portion; and
- an elastic arm connected to the hooking portion and the body.

3. The bracket structure according to claim 2, wherein the hooking portion has a hook length between 0.5 mm and 2.5 mm.

4. The bracket structure according to claim 2, wherein one end of the hooking portion close to the accommodating groove has a guiding angle, and the guiding angle is a rounded corner.

5. The bracket structure according to claim 2, wherein the elastic arm has a width length ratio between 2.7 and 8.0.

6. The bracket structure according to claim 1, further comprising:
- a piece connected to the at least one first stop part, and protruding from the at least one first stop part towards the virtual connection line.

7. The bracket structure according to claim 6, wherein the piece has a height, the two retaining walls respectively have a retaining height, and a ratio of the height to the retaining height is between 0.2 and 0.8.

8. An antenna fixing device, comprising:
- an antenna module comprising
  - a substrate having a plate shape and extending along a virtual connection line; and
- a bracket structure configured to fix the antenna module, comprising:
  - a body;
  - two retaining walls respectively connected to two ends of the body and respectively forming an accommodating groove with the body to accommodate the antenna module, and the virtual connection line being extended between the two accommodating grooves;
  - at least one first stop part disposed on the body and protruding from the body towards the virtual connection line; and
  - at least one second stop part disposed on at least one of the two retaining walls and protruding from the at least one of the two retaining walls towards the virtual connection line, and the at least one first stop part and the at least one second stop part separated by a clamping space in a direction;
- wherein the direction is perpendicular to the virtual connection line, and the at least one first stop part and the at least one second stop part clamp the substrate from opposite directions towards the clamping space to tighten the antenna module.

9. The antenna fixing device according to claim 8, wherein the bracket structure further comprises:
- at least one hook disposed on top of the body, comprising:
  - a hooking portion configured to fix the antenna module to the two accommodating grooves; and
  - an elastic arm connected to the hooking portion and the body.

10. The antenna fixing device according to claim 9, wherein the hooking portion has a hook length between 0.5 mm and 2.5 mm.

11. The antenna fixing device according to claim 9, wherein one end of the hooking portion close to the accommodating groove has a guiding angle, and the guiding angle is a rounded corner.

12. The antenna fixing device according to claim 9, wherein the elastic arm has a width length ratio between 2.7 and 8.0.

13. The antenna fixing device according to claim 8, wherein the antenna module comprises a connection cable connected to the substrate;

the bracket structure further comprises a cable management fastener connected to the body, comprising:

a cable buckle hole configured to limit the connection cable; and an opening, wherein the connection cable enters the cable buckle hole through the opening.

14. The antenna fixing device according to claim 13, wherein the connection cable has a cable diameter, the cable buckle hole has an aperture and an outer diameter, and the opening has a width;

a ratio of the aperture to the cable diameter is between 1.1 and 1.4;

a ratio of the width to the cable diameter is between 0.70 and 0.95; and a ratio of the outer diameter to the aperture is between 1.5 and 3.0.

15. The antenna fixing device according to claim 8, wherein the antenna module comprises a notch;

the bracket structure further comprises a piece connected to the at least one first stop part, and protrudes from the at least one first stop part towards the virtual connection line, and the piece corresponds to the notch.

16. The antenna fixing device according to claim 15, wherein the piece has a height, the two retaining walls respectively have a retaining height, and a ratio of the height to the retaining height is between 0.2 and 0.8.

* * * * *